(12) United States Patent
Ratnam et al.

(10) Patent No.: US 12,490,121 B2
(45) Date of Patent: Dec. 2, 2025

(54) METHOD AND APPARATUS FOR ENHANCED MULTI-LINK MULTI RADIO (EMLMR) OPERATION

(71) Applicant: Samsung Electronics Co., Ltd., Suwon-si (KR)

(72) Inventors: Vishnu Vardhan Ratnam, Plano, TX (US); Rubayet Shafin, Allen, TX (US); Boon Loong Ng, Plano, TX (US); Peshal Nayak, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 18/335,011

(22) Filed: Jun. 14, 2023

(65) Prior Publication Data
US 2023/0422057 A1 Dec. 28, 2023

Related U.S. Application Data

(60) Provisional application No. 63/355,873, filed on Jun. 27, 2022.

(51) Int. Cl.
*H04W 24/02* (2009.01)
*H04W 84/12* (2009.01)

(52) U.S. Cl.
CPC ............ *H04W 24/02* (2013.01); *H04W 84/12* (2013.01)

(58) Field of Classification Search
CPC .............................. H04W 24/02; H04W 84/12
See application file for complete search history.

(56) References Cited

U.S. PATENT DOCUMENTS

2015/0085653 A1* 3/2015 Vermani ............ H04W 28/0215
370/230
2021/0377856 A1 12/2021 Chu et al.
(Continued)

FOREIGN PATENT DOCUMENTS

| EP | 4181583 A1 | 5/2023 |
| KR | 10-2022-0022873 A | 2/2022 |
| WO | 2021251758 A1 | 12/2021 |

OTHER PUBLICATIONS

International Search Report and Written Opinion issued Sep. 19, 2023 regarding International Application No. PCT/KR2023/008599, 7 pages.

(Continued)

*Primary Examiner* — Mohammad S Anwar

(57) ABSTRACT

Methods and apparatuses for facilitating enhanced multi-link multi-radio (EMLMR) operation of multi-link devices (MLDs). A non-access point (AP) MLD comprises EMLMR STAs, each comprising a transceiver configured to form a link with a corresponding AP of an AP MLD, and a processor. Each link is configured to support a respective basic modulation and coding scheme (MCS) and number of spatial streams (NSS), and the links are EMLMR links configured to operate in an EMLMR mode of operation in which the EMLMR links support an enhanced MCS and NSS. A first of the EMLMR STAs, in the EMLMR mode of operation, is configured to conduct a first EMLMR frame exchange with a first of the APs over a first of the links. The processor is operably coupled to the EMLMR STAs, and configured to control a behavior of other EMLMR STAs on other EMLMR links during the first EMLMR frame exchange.

20 Claims, 10 Drawing Sheets

(56) References Cited

U.S. PATENT DOCUMENTS

| | | |
|---|---|---|
| 2022/0029736 A1* | 1/2022 | Chu .................. H04L 1/0025 |
| 2022/0104261 A1 | 3/2022 | Kwon et al. |
| 2022/0174536 A1 | 6/2022 | Kwon et al. |
| 2023/0224989 A1 | 7/2023 | Kim et al. |

OTHER PUBLICATIONS

Lu et al., "CC36 CR for EMLMR Links", doc.: IEEE 802.11-21/1840r4, Mar. 2022, 9 pages.

IEEE Standards Association; IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

IEEE P802.11be-D2.0 "Part 11: Wireless LAN Medium Access Control (MAC) and Physical Layer (PHY) Specifications—Amendment 8: Enhancements for extremely high throughput (EHT)" May 2022, 873 pages.

IEEE Std 802.11-2016, "Part 11: Wireless LAN Medium Access Control (MAC) and Physical Layer (PHY) Specifications", 2016, 3534 pages.

Extended European Search Report issued Apr. 9, 2025 regarding Application No. 23831800.0, 10 pages.

\* cited by examiner

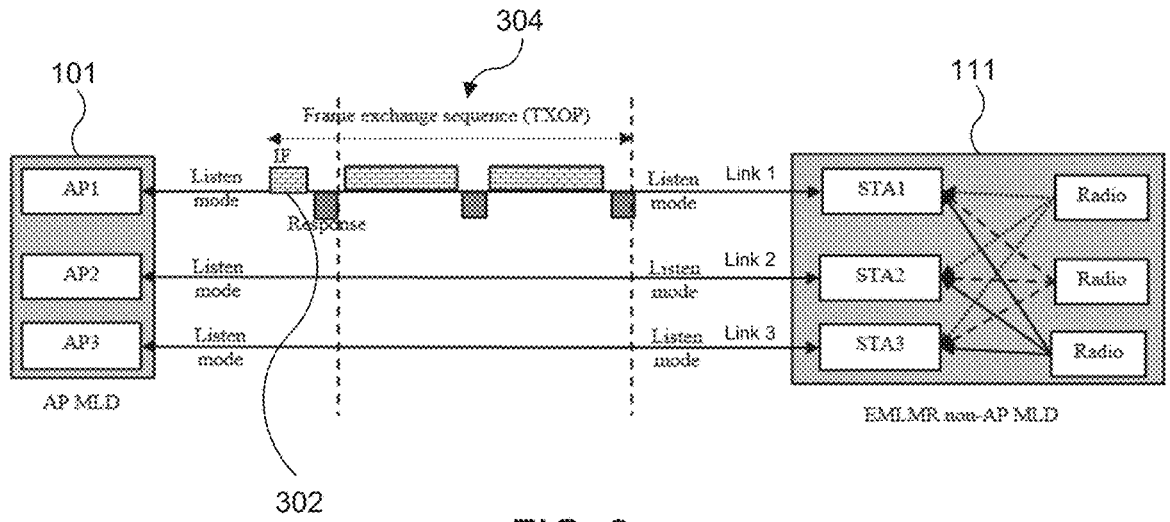
FIG. 3
| B0 | B1 | B2  B17 | B18  B23 | B24  B39 | B40  B41 | B42  B65/89/113 |
|---|---|---|---|---|---|---|
| EMLSR mode | EMLMR mode | EMLSR Link Bitmap | Reserved | EMLMR Link Bitmap | MCS Map count | EMLMR supported MCS and NSS Set |
| Bits: 1 | 1 | 16 | 6 | 0 or 16 | 0 or 2 | variable |
FIG. 4
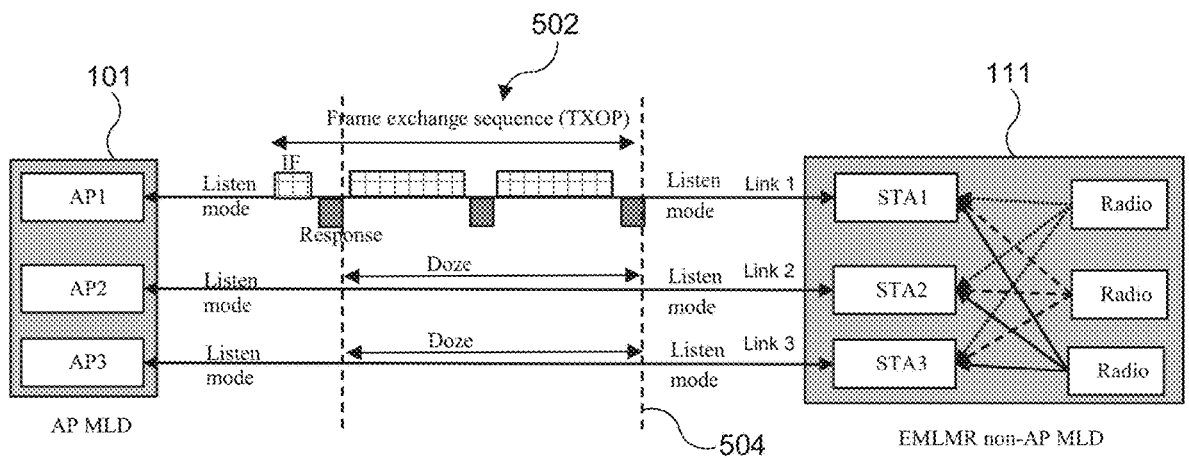
FIG. 5

METHOD AND APPARATUS FOR ENHANCED MULTI-LINK MULTI RADIO (EMLMR) OPERATION

CROSS-REFERENCE TO RELATED APPLICATION AND CLAIM OF PRIORITY

This application claims priority under 35 U.S.C. § 119(e) to U.S. Provisional Patent Application No. 63/355,873 filed on Jun. 27, 2022, which is hereby incorporated by reference in its entirety.

TECHNICAL FIELD

This disclosure relates generally to operation of multi-link devices in wireless communications systems. Embodiments of this disclosure relate to methods and apparatuses for facilitating enhanced multi-link multi-radio operations for multi-link devices in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. For each link, a non-AP MLD indicates a set of supported maximum number of spatial streams (NSS) and modulation and coding schemes (MCS) in the "EHT-MCS Map" subfield of the "Supported EHT MCS and NSS Set" field of the EHT capabilities element. This is referred to as the link-specific "Basic MCS and NSS".

The component of an MLD that is responsible for transmission and reception on one link is referred to as a station (STA). In several embodiments of non-AP MLDs, transmission on one of the links can cause limitations or impairments on the STAs of the non AP MLD operating other links. For example, in one class of non-AP MLDs, a pair of links can form a non-simultaneous transmit and receive (NSTR) pair. In an NSTR pair of links, transmission on one link by a STA of the non-AP MLD can cause a very high self-interference at the STA of the non-AP MLD operating on the other link of the NSTR pair. Thus, during a transmission on one link by a non-AP MLD, the STA on the other link may be incapable of sensing the channel occupancy and its network allocation vector (NAV) timer may become outdated, causing a loss of medium synchronization.

To improve the supported MCS and NSS opportunistically and thus to improve spectral efficiency, IEEE 802.11be also supports an operating mode for a non-AP MLD device called enhanced multi-link multi-radio (EMLMR) mode. Upon the start of a frame exchange sequence with the AP on a first link, a non-AP MLD in EMLMR mode can move radios across from its other links to the first link to improve the supported MCS and NSS on that link. The set of links at an EMLMR non-AP MLD that have this capability to move radios to and from the link are referred to as EMLMR.

SUMMARY

Embodiments of the present disclosure provide methods and apparatuses for facilitating EMLMR operations for MLDs in a wireless local area network.

In one embodiment, a non-AP MLD is provided, comprising EMLMR STAs and a processor operably coupled to the STAs. The EMLMR STAs each comprise a transceiver configured to form a link with a corresponding AP of an AP MLD. Each of the links is configured to support a respective basic MCS and NSS, and the links are EMLMR links configured to operate in an EMLMR mode of operation in which the EMLMR links support an enhanced MCS and NSS. A first of the EMLMR STAs, in the EMLMR mode of operation, is configured to conduct a first EMLMR frame exchange with a first of the APs over a first of the links. The processor is configured to control a behavior of other EMLMR STAs on other EMLMR links during the first EMLMR frame exchange.

In another embodiment, a method of wireless communication is provided, performed by a non-AP MLD that comprises EMLMR STAs that each form a link with a corresponding AP of an AP MLD. The method includes the step of conducting a first EMLMR frame exchange between a first of the EMLMR STAs in an EMLMR mode of operation and a first of the APs over a first of the links. Each of the links supports a respective basic MCS and NSS and the links are EMLMR links that support an enhanced MCS and NSS in the EMLMR mode of operation. The method further includes the step of controlling a behavior of other EMLMR STAs on other EMLMR links during the first EMLMR frame exchange.

In another embodiment, a non-transitory computer-readable medium is provided, and is configured to store instructions that, when executed by a processor, cause a non-AP MLD to conduct a first EMLMR frame exchange between the non-AP MLD and an AP MLD. The non-AP MLD comprises EMLMR STAs that each form a link with a corresponding AP of the AP MLD, each of the links supports a respective basic MCS and NSS, and the links are EMLMR links that support an enhanced MCS and NSS in an EMLMR mode of operation. The first EMLMR frame exchange is conducted between a first of the EMLMR STAs in the EMLMR mode of operation and a first of the APs over a first of the links. The instructions, when executed, further cause the non-AP MLD to control a behavior of other EMLMR STAs on other EMLMR links during the first EMLMR frame exchange.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-2020, "Wireless LAN Medium Access Control (MAC) and Physical Layer (PHY) Specification"

[2] IEEE P802.11be/D2.0

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates an example of EMLMR operation according to embodiments of the present disclosure;

FIG. 4 illustrates an example format of the EML control field of the EOMNF according to embodiments of the present disclosure;

FIG. 5 illustrates an example of EMLMR operation with secondary links in the doze state according to embodiments of the present disclosure;

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that during EMLMR operation, when a first EMLMR frame exchange is initiated on a first EMLMR link, after transmission of the initial frame the enhanced. MCS and NSS can be used for the duration of the first frame exchange, but the capability of the other EMLMR links as expected by the AP MLD during the first frame exchange is not specified. Accordingly, embodiments of the present disclosure provide methods and apparatuses that define operating behaviors of the other EMLMR links as expected by the AP MLD during the first EMLMR frame exchange.

Embodiments of the present disclosure further recognize that after switching radios to a first EMLMR link for a first EMLMR frame exchange, a non-AP MLD may have some remaining radios that are not needed for the first frame exchange and could be used by the non-AP MLD on other EMLMR links, but the use of those radios on the other EMLMR links is not currently specified. Accordingly, embodiments of the present disclosure provide methods and apparatuses that define operating behaviors for the non-AP MLD to contend for channel access on the other EMLMR links during the first EMLMR frame exchange.

Embodiments of the present disclosure further recognize that the use of the enhanced MCS and NSS for a first EMLMR frame exchange on a first EMLMR link incurs an opportunity cost since the radios switched to the first link for the first frame exchange cannot be used on the other EMLMR links, and in some cases the benefit of enhanced MCS and NSS operation on the first link may not outweigh this opportunity cost. Accordingly, embodiments of the present disclosure provide methods and apparatuses that allow the MLDs to dynamically determine whether to use the enhanced MCS and NSS for any given frame exchange such that, if the enhanced MCS and NSS is not needed, then radios can be left on the other EMLMR links for additional simultaneous frame exchanges.

Figure 1:
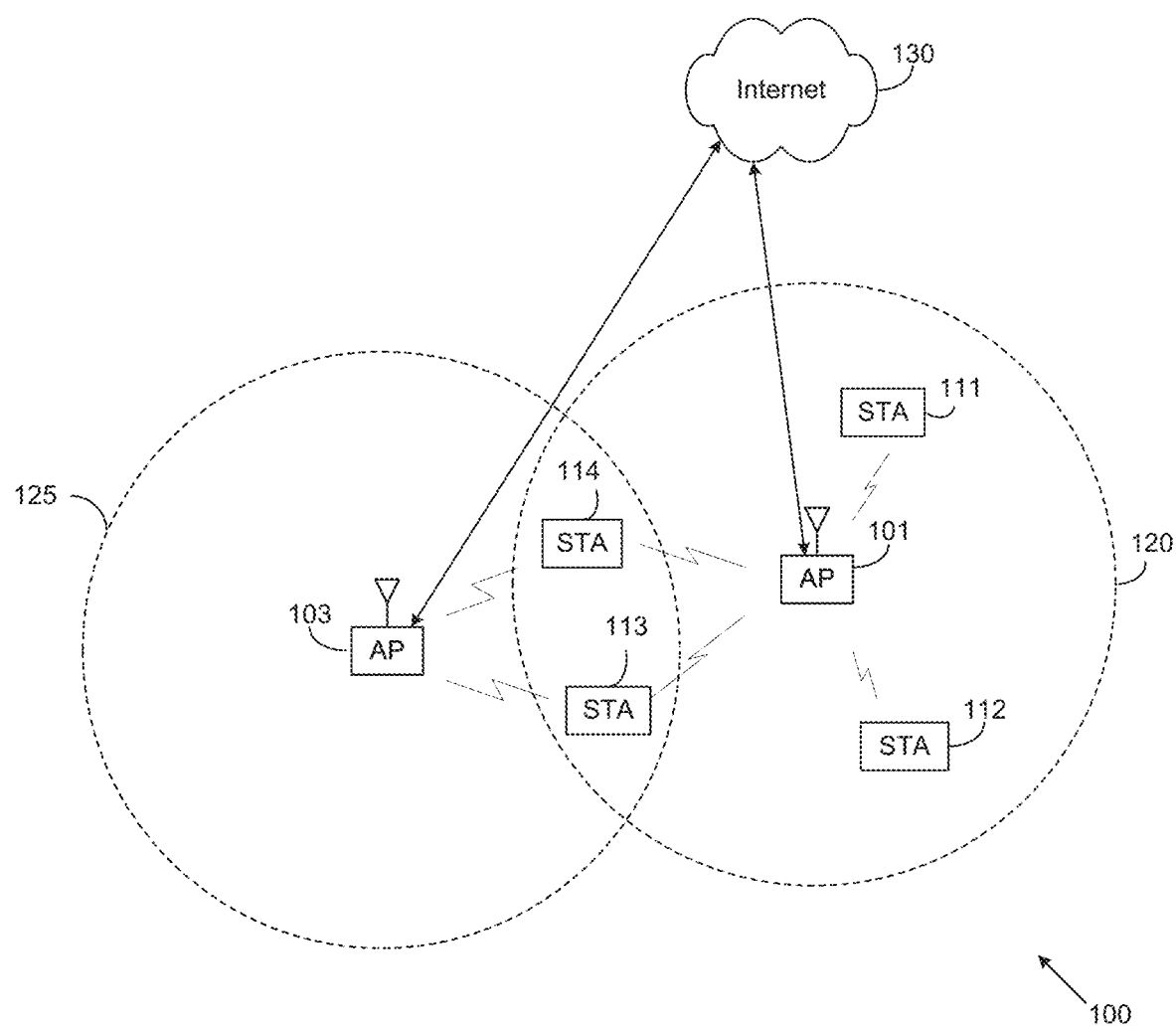
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs, Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating EMLMR operations for MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
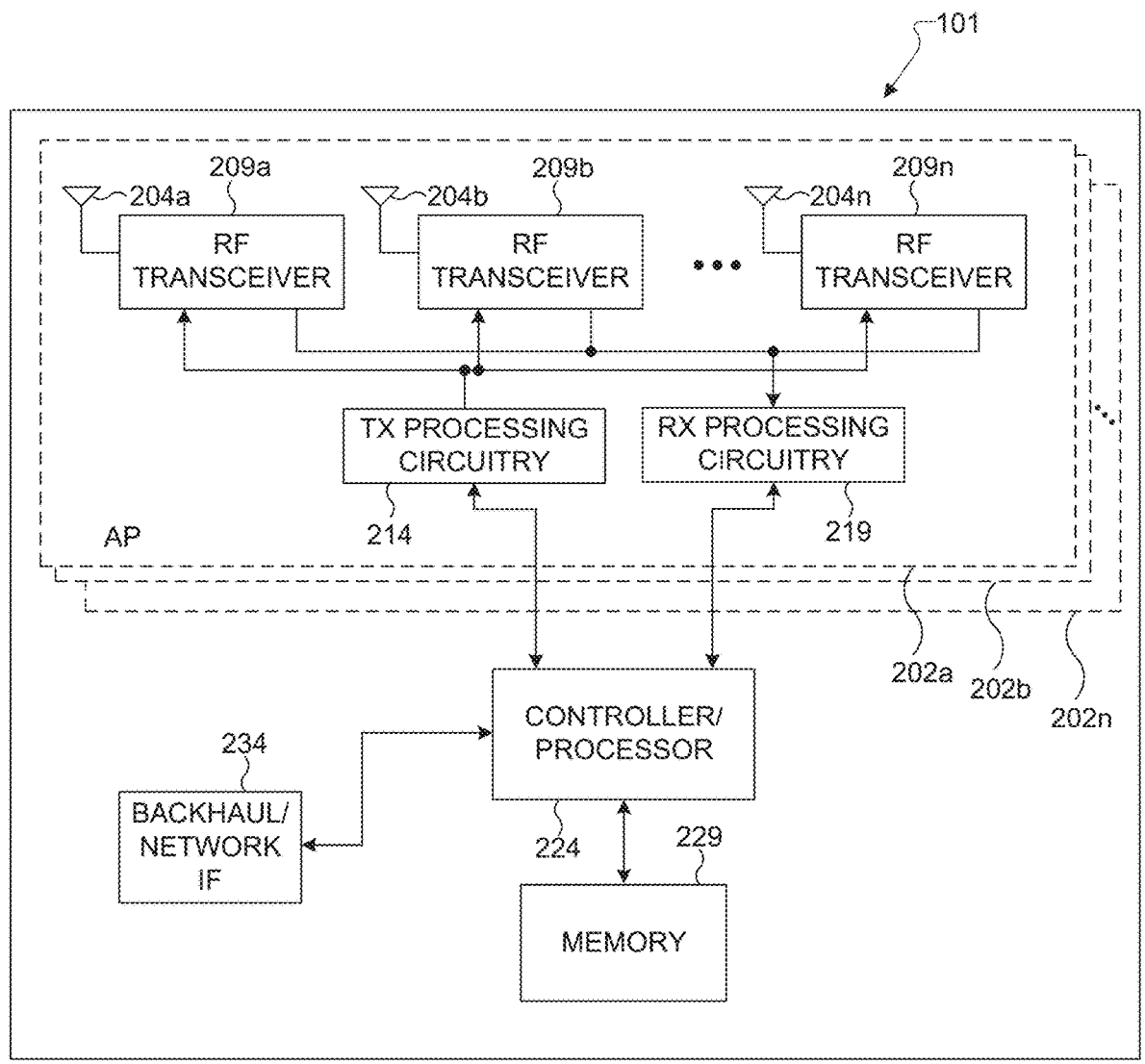
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating EMLMR operations for MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating EMLMR operations for MLDS in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
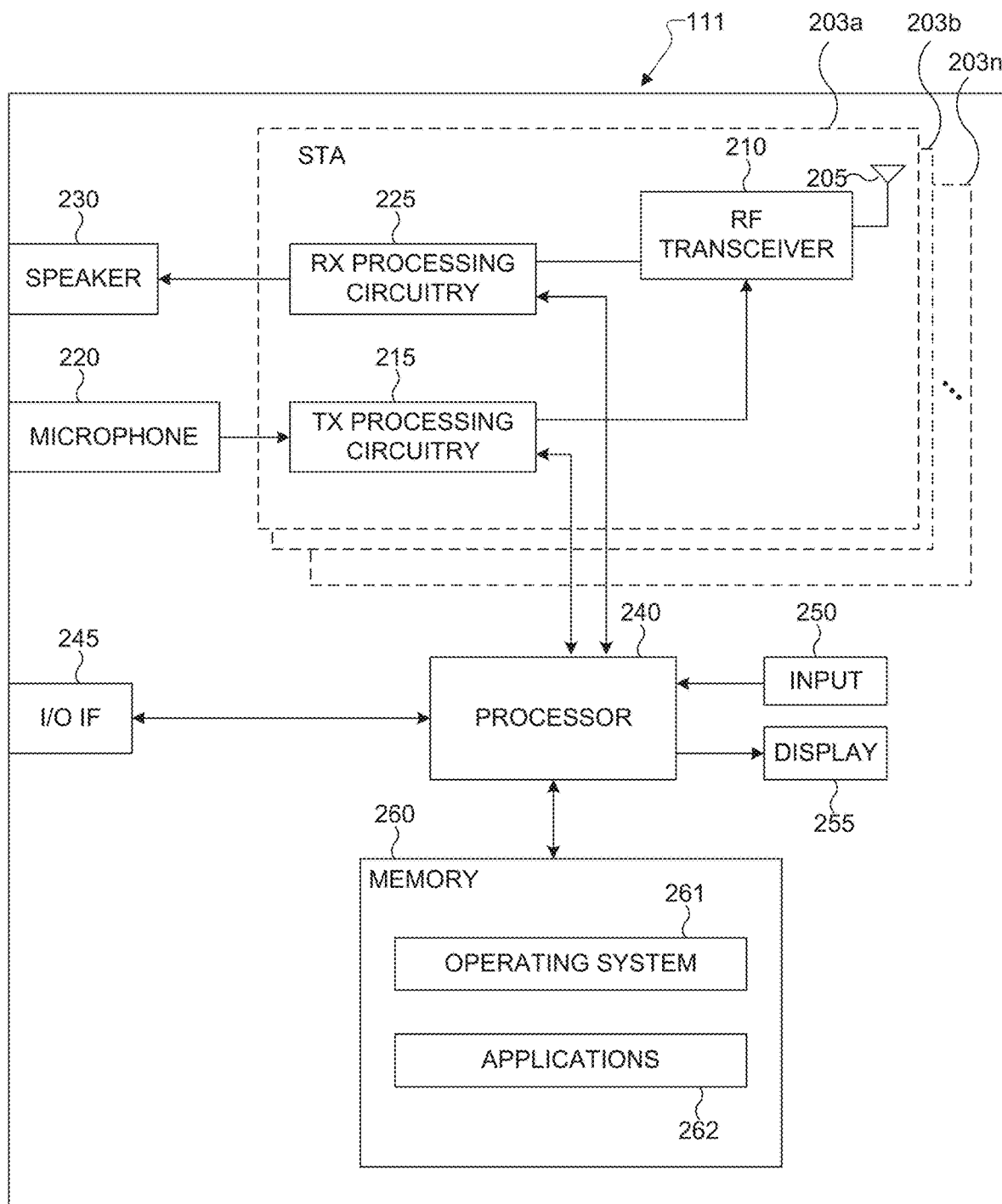
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RE signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205, In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate EMLMR operations for MLDs in WLANs. In some embodiments, the controller/processor 240 includes at least one microprocessor or microcontroller.

The controller/processor 240 is also capable of executing other processes and programs resident in the memory 260, such as operations for facilitating EMLMR operations for MLDs in WLANs. The controller/processor 240 can move data into or out of the memory 260 as required by an executing process. In some embodiments, the controller/processor 240 is configured to execute a plurality of applications 262, such as applications for facilitating EMLMR operations for MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antennas) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

The operating procedure for a non-AP MLD in EMLMR mode is defined in the current 802.11be standard draft. According to this procedure, a non-AP MLD and an AP MLD may declare their ability to support EMLMR operation and the corresponding operation parameters in the enhanced multi-link (EML) capabilities subfield of the basic variant multi-link element that is shared with each other during the association process.

FIG. 3 illustrates an example of EMLMR operation according to embodiments of the present disclosure. In this example, the AP MLD may be an AP MLD 101, and the non-AP MLD may be a non-AP MLD 111. Although the AP MLD 101 is illustrated with three affiliated APs (AP1, AP2, and AP3) and the non-AP MLD 111 is illustrated as a multi-radio non-AP MLD with three affiliated non-AP STAs (STA1, STA2, and STA3) and three radios, it is understood that this process could be applied with suitable MLDs having any number of affiliated APs or STAs, and with differing numbers of radios.

If both the AP MLD and non-AP MLD support EMLMR operation, then in order to initiate EMLMR, operation (also referred to as activating EMLMR operating mode), a STA of the non-AP MLD first transmits an EML Operating Mode Notification Frame (EOMNF), with the "EMLMR mode" bit set to 1 in the EML control field of the frame, to the corresponding AP affiliated with the AP MLD. FIG. 4 illustrates an example format of the EML control field of the EOMNF according to embodiments of the present disclosure. The EOMNF may contain several parameters for the EMLMR operation including the identity of the links that can be considered for the EMLMR mode, via the EMLMR Link bitmap field. In the EML control field of the EOMNF, the non-AP MED also includes an "EMLMR supported MCS and NSS Set" subfield that indicates (via an MCS map), for each channel bandwidth (BW), the maximum supported MCS and NSS combinations in EMLMR mode, which are applicable for all EMLMR links. These values are referred to as "Enhanced MCS and NSS". Within a fixed delay (indicated in the transition timeout subfield of the EML capabilities subfield of the basic variant multi-link element) of transmitting the EOMNF, the non-AP MLD can transition into the EMLMR mode by turning all its STAs associated with EMLMR to active and listen mode. In such a listen mode, the EMLMR non-AP MLD is capable of channel sensing and transmitting and receiving packets on the EMLMR links at the basic MCS and NSS.

Upon winning a transmit opportunity (TXOP) on any one of the EMLMR links associated with the non-AP MLD in EMLMR mode, the AP MLD may initiate the frame exchange with the non-AP MLD by transmitting an initial frame (IF) 302 on that link with sufficient padding. The IF 302 may be, e.g., a multi-user request-to-send (MU-RTS) frame transmitted on link 1 between STA1 and AP1. After receiving the IF 02 from the AP MLD on a certain link, the non-AP MLD may be capable of transmitting and receiving data on that link for the duration of the frame exchange sequence 304 at the enhanced MCS and NSS declared in the EOMNF. This reception at the enhanced MCS and NSS is accomplished by the EMLMR non-AP MLD switching in radios from other links. The padding in the IF is to provide sufficient time for such switching, and this time is disclosed in the EMLMR delay subfield of the EML capabilities field of the basic variant multi-link element.

At the end of the frame exchange sequence 304, all the EMLMR enabled STAs of the non-AP MLD may again switch back to the listen mode to either win a TXOP for uplink transmission, or look for another initial control frame from the AP MLD. To exit from an EMLMR operating mode, the non-AP MLD may transmit an EOMNF with the EMLMR mode bit of the EML control field set to 0 to the AP MLD.

The example of FIG. 3 represents a scenario in which a non-AP MLD has a multi-link association with an AP MLD, and is operating in EMLMR, mode on L links (where L=3 in FIG. 3). There may be additional links between the non-AP MLD and the AP MLD that are not EMLMR enabled links (not illustrated in FIG. 3). In one embodiment, the declared Enhanced MCS and NSS in the EOMNF may not be higher than the maximum NSS supported by any of the APs of the AP MLD corresponding to the EMLMR links.

In a frame exchange between the AP MLD and non-AP MLD on one EMLMR link (referred to as the primary link), the Enhanced MCS and NSS can be used for transmission on that link (after the IF transmission), but the operation of the other EMLMR links (referred to as the secondary links), as interpreted by the AP MLD, during this frame exchange is not specified. With reference to the example of FIG. 3, Link 1 is the primary link on which the frame exchange 304 is conducted, and Link 2 and Link 3 are the secondary links. The operation of Link 2 and Link 3 during the frame exchange 304 is not currently specified. This disclosure provides embodiments of the operating behavior of the other EMLMR links as expected by the AP MLD.

In one embodiment, after transmission of an IF by an AP of the AP MLD to a STA of the non-AP MLD on a first EMLMR link (i.e., when the AP MLD initiates a frame exchange with the non-AP MLD), the link can support the Enhanced MCS and NSS for the rest of the TXOP, and the other EMLMR STAs of the non-AP MLD can be considered to be in the doze state for the remaining duration of the TXOP (or frame exchange sequence). Similarly, when the non-AP MLD initiates a frame exchange sequence with the AP MLD on an EMLMR link, the other EMLMR, STAs of the non-AP MLD are expected to be in the doze state for the duration of the frame exchange sequence. The AP MLD may not initiate a frame exchange sequence with the non-AP MLD (for either uplink or downlink) on the other EMLMR links until the end of the TXOP on the first EMLMR link.

FIG. 5 illustrates an example of EMLMR operation with secondary links in the doze state according to embodiments of the present disclosure. In FIG. 5, Link 1 is the primary link and Link 2 and Link 3 are the secondary links as in the example of FIG. 3. In the example of FIG. 5, however, Link 2 and Link 3 are considered to be in the doze state for the duration of the TXOP (or EMLMR frame exchange) 502 on Link 1. Accordingly, the AP MLD will not initiate another frame exchange sequence with the non-AP MLD on Link 2 or Link 3 until the end of the TXOP at time 504.

In another embodiment, there can be more than one type of EMLMR mode in which a non-AP MLD can operate. The EML control field of the EOMNF may have two bits (e.g., EMLMR mode, EMLMR mode2) reserved to indicate operation in different types of EMLMR modes. For example, (EMLMR mode, EMLMR mode2)=(1, 0) indicates that the operation is in EMLMR Mode 1, (EMLMR mode, EMLMR mode2)=(1, 1) indicates that the operation is in EMLMR Mode 2 and (EMLMR mode, EMLMR mode2)=(0, 0) indicates operation in the non-EMLMR mode.

Figure 6:
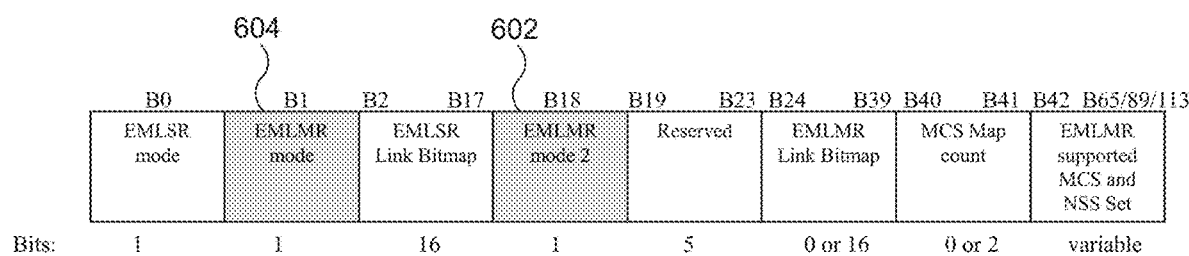
FIG. 6 illustrates an example format of an EML control field of an EOMNF including subfields to indicate two EMLMR modes according to embodiments of the present disclosure.

FIG. 6 illustrates an example format of an EML control field of an EOMNF including subfields to indicate two EMLMR modes according to embodiments of the present disclosure. In the example of FIG. 6 the EMLMR mode2 subfield 602 in conjunction with the EMLMR mode subfield 604 can be used to indicate whether the EMLMR operation mode is Mode 1, Mode 2, or non-EMLMR mode. An example of the operation in Mode 1 and Mode 2 is provided below.

EMLMR Mode 1: In EMLMR Mode 1, after transmission of the IF by an AP of the AP MLD on a first EMLMR link to the non-AP MLD, the link can support the Enhanced MCS and NSS. The other EMLMR STAs of the non-AP MLD are expected to be in the doze state for the remaining duration of the frame exchange sequence on the first link. Similarly, when a non-AP MLD initiates a frame exchange sequence with AP MLD on a first EMLMR link, the other EMLMR links are expected to be in the doze state for the duration of the frame exchange sequence on the first link. The AP MLD may not initiate a frame exchange with the non-AP MLD on the other EMLMR links until the end of the frame exchange sequence on the first EMLMR link. This mode is similar to the example of FIG. 5.

EMLMR Mode 2: In EMLMR Mode 2, after transmission of the IF by an AP of the AP MLD on a first EMLMR link to the non-AP MLD, the link can support the Enhanced MCS and NSS. However, the other EMLMR STAs of the non-AP MLD are expected to be active and support at least 1 NSS (for uplink or downlink) for the remaining duration of this frame exchange sequence. The supported max MCS for this one NSS on each secondary link can be inferred from the "supported EHT-MCS and NSS set" subfield of the EHT capabilities element transmitted by the non-AP MLD for the respective link.

Figure 7:
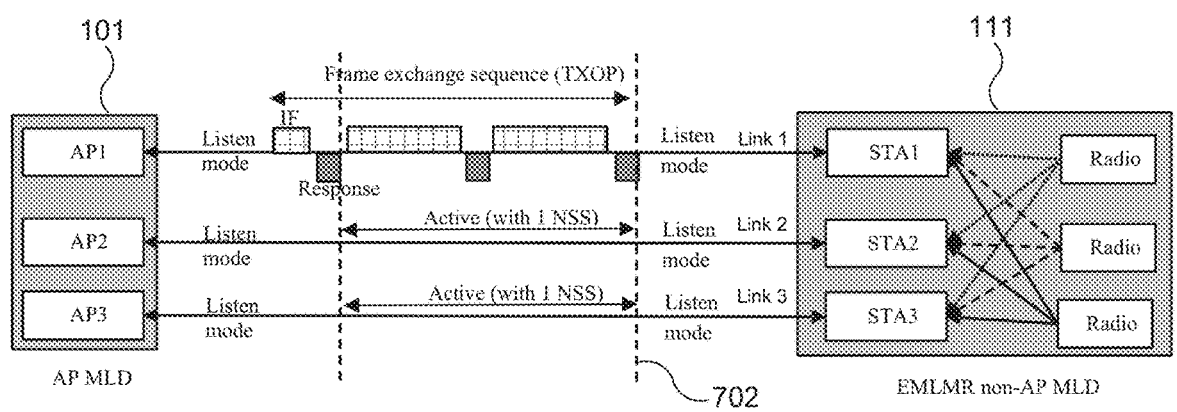
FIG. 7 illustrates an example of EMLMR operation in EMLMR Mode 2 with secondary links in the active state supporting at least 1 NSS according to embodiments of the present disclosure.

FIG. 7 illustrates an example of EMLMR, operation in EMLMR Mode 2 with secondary links in the active state supporting at least 1 NSS according to embodiments of the present disclosure. In this example, Link 2 and Link 3 are active with support for 1 NSS during the frame exchange on Link 1. Similarly, when the non-AP MLD initiates a frame exchange sequence with AP MLD on an EMLMR link, the other EMLMR links are expected to be able to support at least 1 NSS for the duration of the frame exchange sequence.

During the frame exchange on the first EMLMR link, the AP MLD may transmit to (or solicit uplink transmission from) the non-AP MLD on the other EMLMR links with 1 NSS. In one variant of this embodiment, this frame exchange on the other EMLMR links can be initiated without an IF. The AP MLD may, however, ensure that the end time of any other frame exchange with the non-AP MLD on the other EMLMR links (Link 2 or Link 3) aligns with or ends before the end time 702 of the frame exchange sequence on the first link (Link 1). In one variant of this embodiment, all EMLMR STAs of the non-AP MLD may transition back to listen mode upon the end of the frame exchange sequence on the first EMLMR link. In one variant of this embodiment, the EMLMR non-AP MLD may not lose medium synchronization on the other EMLMR links while being involved in a frame exchange sequence on a first EMLMR link. In one variant of this embodiment, an EMLMR non-AP MLD may not operate in EMLMR Mode 2 if any of its EMLMR links form an NSTR pair.

In another embodiment, the EML control field of the EOMNF transmitted by a non-AP MLD to initiate a switch to EMLMR mode may include a new subfield—"NSS retained in EMLMR"—to indicate a number of NSS expected to be retained on each of the other (e.g., secondary) EMLMR links of the non-AP MLD during a frame exchange on a first (e.g., primary) EMLMR link. This number of NSS is referred to as "retained NSS" in this disclosure. The presence of this new subfield can be indicated by another bit in the EML control field called the "NSS retained present" bit.

Figure 8:
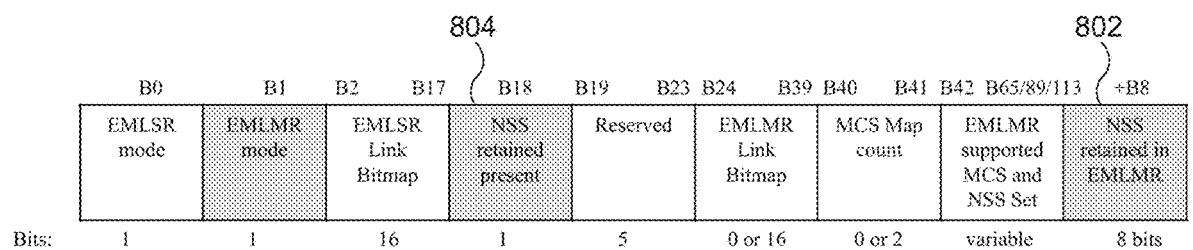
FIG. 8 illustrates an example format of an EML control field of an EOMNF including subfields to indicate a number of retained NSS according to embodiments of the present disclosure.

FIG. 8 illustrates an example format of an EML control field of an EOMNF including subfields to indicate a number of retained NSS according to embodiments of the present disclosure. The NSS retained in EMLMR subfield 802 may indicate the number of retained NSS, and the NSS retained present subfield 804 may be used to indicate the presence or absence of the NSS retained in EMLMR subfield 802 in the EML control field.

Figure 9:
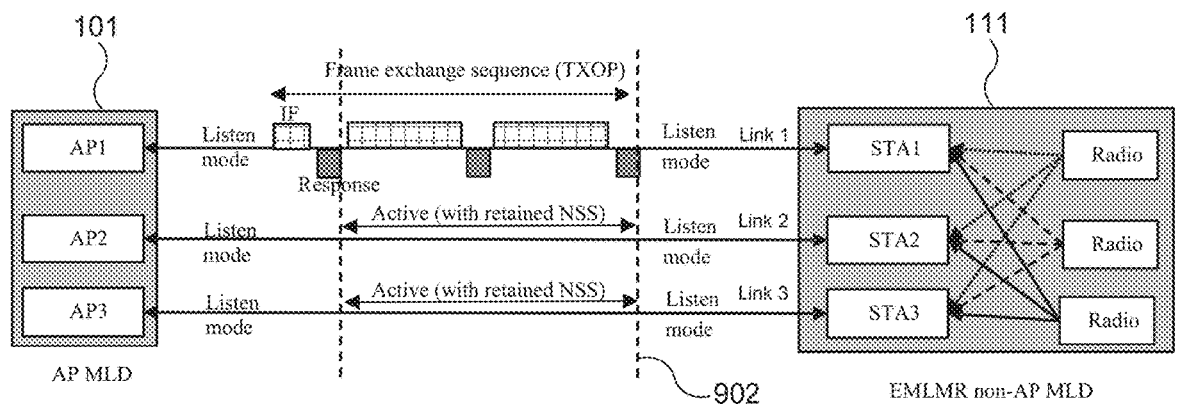
FIG. 9 illustrates an example of EMLMR operation with secondary links in the active state with retained NSS according to embodiments of the present disclosure.

FIG. 9 illustrates an example of EMLMR operation with secondary links in the active state with retained NSS according to embodiments of the present disclosure. After an AP of the AP MLD transmits an IF to an EMLMR STA of the non-AP MLD to initiate a frame exchange sequence on Link 1, the link can support the Enhanced MCS and NSS for the remaining duration of the frame exchange sequence. However, the other EMLMR STAs of the non-AP MLD are expected to support at least the retained NSS (on Link 2 and Link 3) for the remaining duration of the frame exchange sequence. Similarly, when a first EMLMR STA of a non-AP MLD initiates a frame exchange sequence with an AP of the AP MLD on Link 1, the other EMLMR STAs are expected to be able to support the retained NSS on Link 2 and Link 3 for the remaining duration of the frame exchange sequence. The supported max MCS when using retained NSS can be inferred from the "supported EHT-MCS and NSS set" subfield of the EHT capabilities element transmitted by the non-AP MLD for each of the links.

After the start of a frame exchange on a first EMLMR link between the AP MLD and non-AP MLD, the AP MLD may initiate a frame exchange with the non-AP MLD on the other EMLMR links (with or without using an IF) with the retained NSS if the "NSS retained in EMLMR" subfield is set to non-zero value. The AP MLD may, however, ensure that the end time of the frame exchange with the non-AP MLD on the other EMLMR links aligns with or ends before the end time 902 of the frame exchange sequence on the first EMLMR link.

The other EMLMR STAs of the non-AP MLD are expected to be in doze state for the duration of the frame exchange sequence on the first link if the "NSS retained in EMLMR" subfield is set to zero value or of the "NSS retained present" bit is set to 0. In one variant of this embodiment, all EMLMR STAs of the non-AP MLD may transition back to listen mode upon the end of the frame exchange sequence on the first EMLMR link. In one variant of this embodiment, the start of the frame exchange on the other EMLMR links may not need an IF. In a variant of this embodiment, the EMLMR non-AP MLD may not lose medium synchronization on the other EMLMR links when involved in a frame exchange sequence on a first EMLMR link if retained NSS>0. In one variant of this embodiment, an EMLMR non-AP MLD may set the "NSS retained present" bit to 0 or the "NSS retained in EMLMR" subfield of the EML control field of the EOMNF to 0 value if any of its EMLMR links form an NSTR pair.

When an EMLMR STA of a non-AP MLD is involved in an EMLMR frame exchange with the AP MLD on a first EMLMR link (the primary link), it can have some remaining radios on other EMLMR links (the secondary links), even after switching radios to the primary link to support Enhanced MCS and NSS. It is not currently specified whether the non-AP MLD is able to contend for uplink channel access on the secondary links for the duration of the frame exchange sequence on the primary link. Accordingly, this disclosure provides embodiments that facilitate the non-AP MLD contending for uplink channel access on the secondary links during the frame exchange sequence on the primary link.

Figure 10:
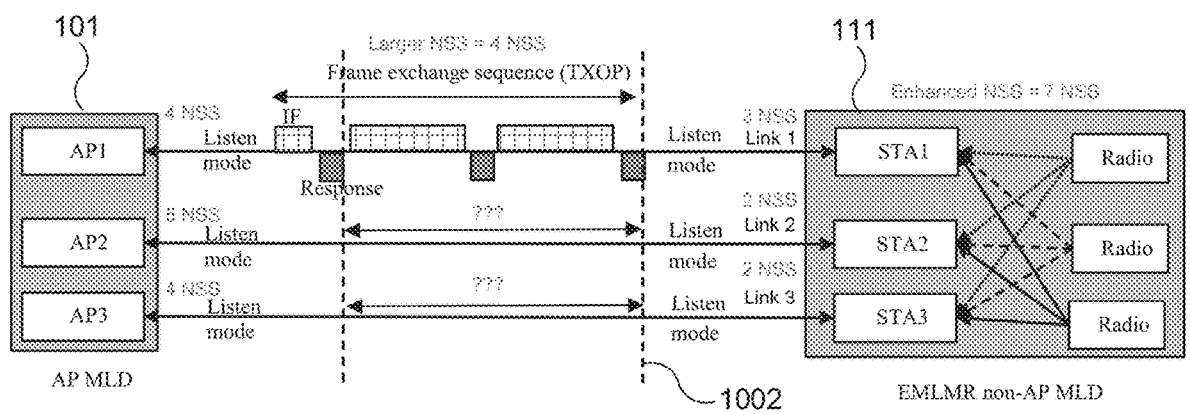
FIG. 10 illustrates an example of EMLMR operation with radios remaining on secondary links during EMLMR frame exchange on a primary link according to embodiments of the present disclosure.

FIG. 10 illustrates an example of EMLMR operation with radios remaining on secondary links during EMLMR frame exchange on a primary link according to embodiments of the present disclosure. In the example of FIG. 10, the STA of the non-AP MLD (STA1) operating on the primary link (Link 1) has a Basic NSS of 3 NSS and the AP of the AP MLD (AP1) operating on Link 1 supports 4 NSS, while the non-AP MLD supports an Enhanced NSS of 7 NSS. Accordingly, even after switching to EMLMR mode operation with Enhanced MCS and NSS for the frame exchange on Link 1, the non-AP MLD only has 4 NSS assigned to Link 1 and has 3 NSS available.

Operation for the primary link: In one embodiment, when a non-AP MLD initiates a frame exchange sequence with an AP MLD on a first EMLMR link, the non-AP MLD may use any MCS and NSS, subject to the per link MCS and NSS capabilities of the AP of the AP MLD (e.g., 4 NSS for AP1 in FIG. 10) and subject to the enhanced MCS and NSS reported in the EOMNF by the non-AP MLD (e.g., 7 NSS in FIG. 10). In one embodiment, padding may not be required in the initial frame transmitted by the non-AP MLD on the first link. In another embodiment, when the AP MLD initiates the frame exchange sequence, the non-AP MLD may use the MCS and NSS indicated by the AP MLD.

Operation the secondary links: In one embodiment, during the frame exchange sequence on the primary link the other EMLMR STAs of the non-AP MLD may perform channel sensing to update their NAV (if possible), but may not initiate an uplink transmission with the AP MLD for the duration of the first frame exchange sequence.

In another embodiment, during the frame exchange sequence on the primary link the other EMLMR STAs of the non-AP MLD can initiate frame exchange sequences with their respective APs that overlap with the TXOP on the primary link. These frame exchanges on the secondary links are subject to any MCS and NSS capabilities/requirements of the corresponding AP, and should have end times that align with the end time 1002 of the frame exchange sequence on the first link. In one variant of this embodiment, frame exchange sequences initiated by the other EMLMR STAs may be initiated with a trigger frame. In one variant of this embodiment, the allowed NSS to be used for the transmissions on the other EMLMR links can be pre-fixed (e.g., 1 NSS). In another variant of this embodiment, the allowed MCS and NSS to be used on the other EMLMR links can be additionally subject to the expected MCS and NSS capabilities for those STAs (as perceived by the AP MLD) as defined by the embodiments above.

In one embodiment, during the frame exchange sequence on the primary EMLMR link, another EMLMR STA of the non-AP MLD can transmit a trigger frame, such as a QoS data frame or a null data packet or a PS-poll frame, to indicate to the corresponding AP of the AP MLD that it is awake and capable of receiving traffic at the basic MCS and NSS corresponding to that link (e.g., 2 NSS for Link 2 or Link 3 in FIG. 10).

When a frame exchange is initiated between the AP MLD and an EMLMR non-AP MLD on a first EMLMR link (the primary link), after the initial frame, frames from the second frame onwards can be transmitted at the Enhanced NSS and MCS, while the other EMLMR links (the secondary links) have reduced capabilities or are in doze. This can reduce system performance in some scenarios. For example, when simultaneous transmission on secondary links might be feasible, when the amount of buffered data on the primary link is small, when the AP of AP MLD on the primary link has a low channel bandwidth or supports low NSS, and so forth. Accordingly, this disclosure provides embodiments that improve performance by facilitating flexibility in NSS and MCS levels such that the non-AP MLD does not have to switch all radios to the primary link for an EMLMR frame exchange, and can simultaneously receive traffic on the secondary links.

In one embodiment, the initiator of an EMLMR frame exchange sequence is able to select between different modes of EMLMR operation on a per-TXOP basis. These modes of EMLMR operation are referred to as an "Enhanced TXOP mode" and a "Basic TXOP mode".

Figure 11:
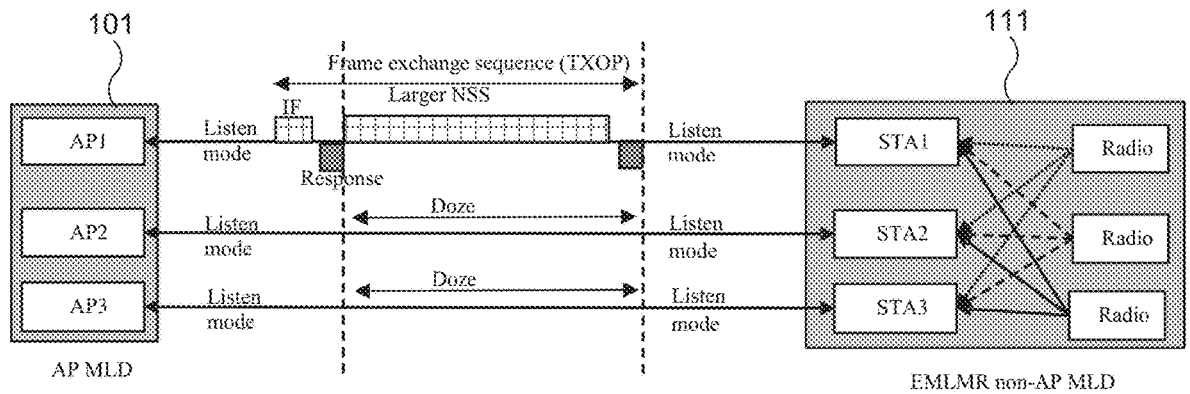
FIG. 11 illustrates an example of EMLMR operation in an enhanced TXOP mode according to embodiments of the present disclosure.

FIG. 11 illustrates an example of EMLMR operation in an enhanced TXOP mode according to embodiments of the present disclosure. For a TXOP initiated on a first EMLMR link (the primary link) in this mode, the non-AP MLD is expected to switch radios to the primary EMLMR link to support the Enhanced MCS and NSS during the frame exchange sequence. The other EMLMR STAs of the non-AP MLD are expected to be in the doze state on the other EMLMR links (the secondary links) for the duration of the frame exchange sequence on the primary link. The AP MLD may not initiate a frame exchange sequence with the non-AP MLD on the secondary EMLMR links until the end of the frame exchange sequence on the primary EMLMR link.

Figure 12:
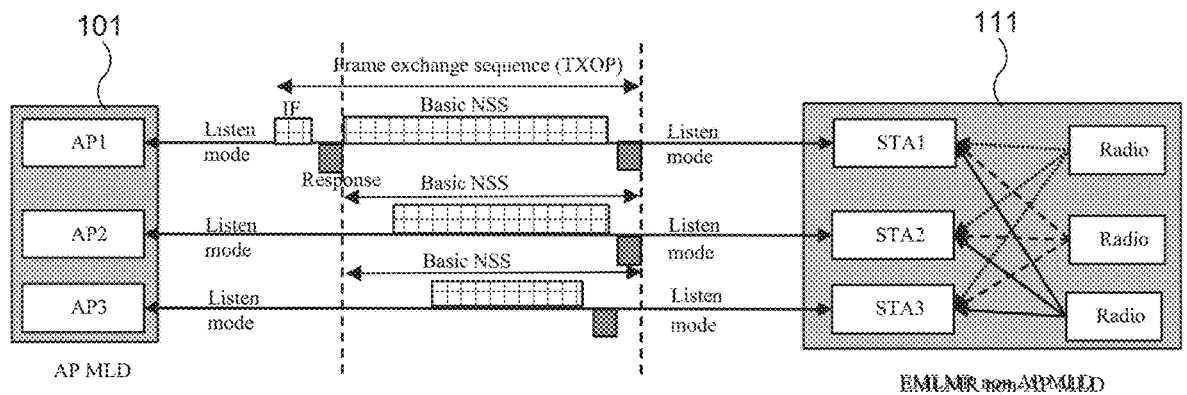
FIG. 12 illustrates an example of EMLMR operation in a basic TXOP mode according to embodiments of the present disclosure.

FIG. 12 illustrates an example of EMLMR operation in a basic TXOP mode according to embodiments of the present disclosure. For a TXOP initiated on a first EMLMR link (the primary link) in this mode, the non-AP MLD is not expected to switch any new radios to the primary link. Transmission of all frames in the frame exchange sequence can be at (or below) the basic MCS and NSS corresponding to the primary link. A frame exchange sequence may simultaneously be initiated between the AP MLD and non-AP MLD on the other EMLMR links (the secondary links) at the basic MCS and NSS corresponding to those links. However, the AP MLD and non-AP MLD may ensure that that the frame exchange sequences on the secondary EMLMR links end at or before the end time of the frame exchange on the primary link. All EMLMR STAs of the non-AP MLD may transition back to listen mode upon the end of the frame exchange sequence on the primary EMLMR link.

When an EMLMR non-AP MLD is operating in EMLMR listen mode, the mode of operation is indicated by the first frame initiated on any of the EMLMR links and it may be valid for the duration of that frame exchange sequence. Different embodiments for indicating the operation mode within the first frame exchange sequence are provided below.

In one embodiment, when a first frame exchange sequence is initiated by an AP of an AP MLD without a trigger frame as the initial frame, the indicated operation mode for the duration of the frame exchange sequence is the basic TXOP mode. Otherwise the indicated operation mode is the enhanced TXOP mode.

In one embodiment, when the first frame exchange is initiated by the AP of the AP MLD with an initial frame (IF), the padding field length in the IF may be set to a predetermined length of "xx" octets to indicate the operation is the basic TXOP mode. When other padding lengths are used, the indicated operation mode is the enhanced TXOP mode. For example, the value of "xx" may be 0 octets (no padding).

In one embodiment, when the AP of an AP MLD initiates the first frame exchange sequence using an MU-RTS trigger frame, the AP MLD may set the "number of spatial streams" subfields of the "SS Allocation/RA-RU Information" fields of the User-info field corresponding to the EMLMR, non-AP STA to indicate the number of spatial streams it plans to use for the frame exchange sequence. If the value is less than or equal to the Basic MCS and NSS values, the mode of operation indicated is the basic TXOP mode. Otherwise the operation may be in the enhanced TXOP mode.

In one embodiment, when the AP of an AP MLD initiates the first frame exchange sequence using an ICF (trigger frame), the (currently reserved) bit B39 of the user info field corresponding to the STA is used to indicate whether the desired operation mode is the basic TXOP mode (B39 set to 0) or the enhanced TXOP ode (B39 set to 1).

In some embodiments, similar indications as above can be used when the first frame exchange sequence is initiated by an EMLMR STA of the non-AP MLD with the corresponding AP of the AP MLD.

In one embodiment, when a STA of the EMLMR non-AP MLD initiates the first frame exchange sequence with the AP MLD, the number of spatial streams indicated in the HE-SIG-A field of the first PPDU can be used by the AP MLD to determine if the operation of the non-AP MLD is in the basic TXOP mode or in the enhanced TXOP mode. For example, if the number of spatial streams is lower than the basic MCS and NSS, then the indicated operating mode is the basic TXOP mode and otherwise it is the enhanced TXOP mode. In one variant, indication of the NSS in control frames (e.g., RTS) is not considered in making this determination at the AP MLD.

In one embodiment, the AP MLD or the non-AP MLD may indicate the number of spatial streams they plan to use for a frame exchange sequence in the initial frame. In this case, they may ensure that other PPDUs in the sequence are transmitted at the same or lower number of spatial streams.

Figure 13:
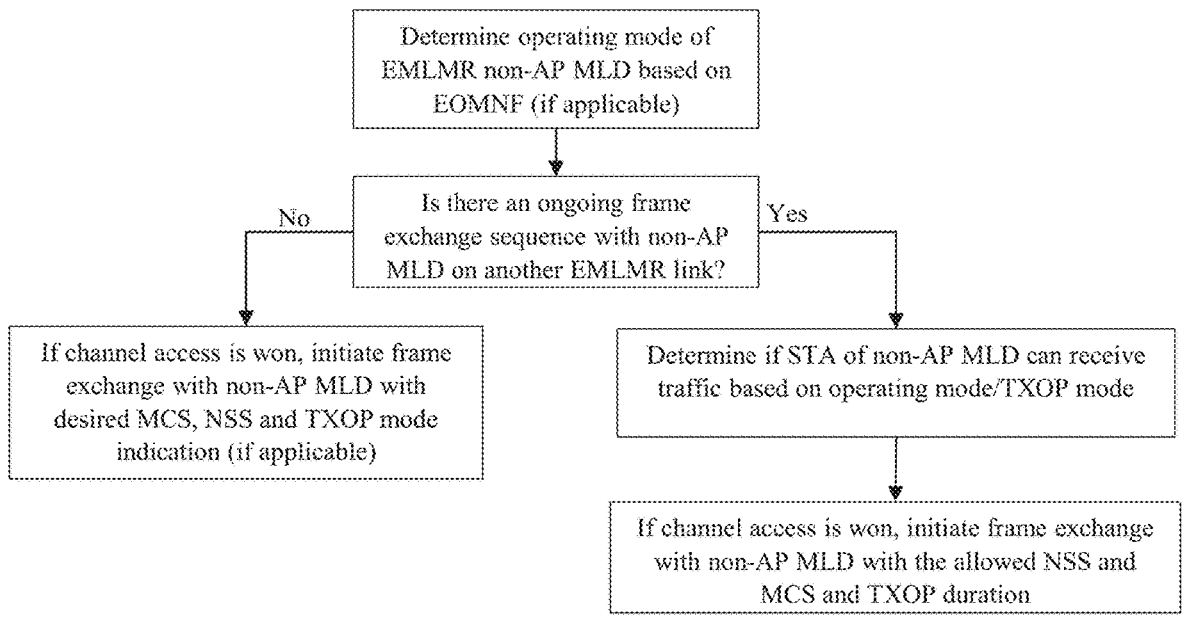
FIG. 13 illustrates an example flow diagram of EMLMR AP MLD operation to initiate frame exchange sequences on secondary EMLMR links during an ongoing frame exchange sequence on a primary link according to embodiments of the present disclosure.

FIG. 13 illustrates an example flow diagram of EMLMR AP MLD operation to initiate frame exchange sequences on secondary EMLMR links during an ongoing frame exchange sequence on a primary link according to embodiments of the present disclosure. The operation of FIG. 13 includes the indication by the AP MLD of its capabilities on secondary EMLMR links when a frame exchange is ongoing on a primary EMLMR link.

Figure 14:
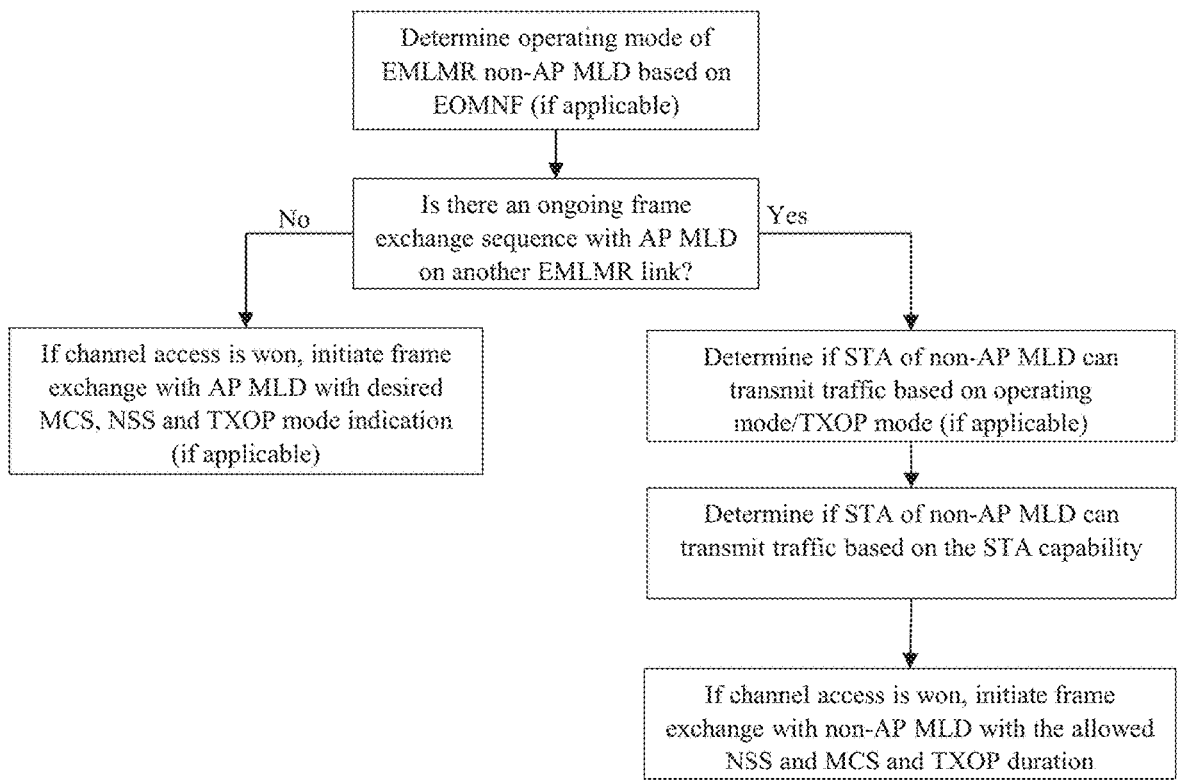
FIG. 14 illustrates an example flow diagram of EMLMR non-AP MLD operation to initiate frame exchange sequences on secondary EMLMR links during an ongoing frame exchange sequence on a primary link according to embodiments of the present disclosure.

FIG. 14 illustrates an example flow diagram of EMLMR non-AP MLD operation to initiate frame exchange sequences on secondary EMLMR links during an ongoing frame exchange sequence on a primary link according to embodiments of the present disclosure. The operation of FIG. 14 includes the indication by the non-AP MLD of its capabilities on secondary EMLMR links when a frame exchange is ongoing on a primary EMLMR link.

Figure 15:
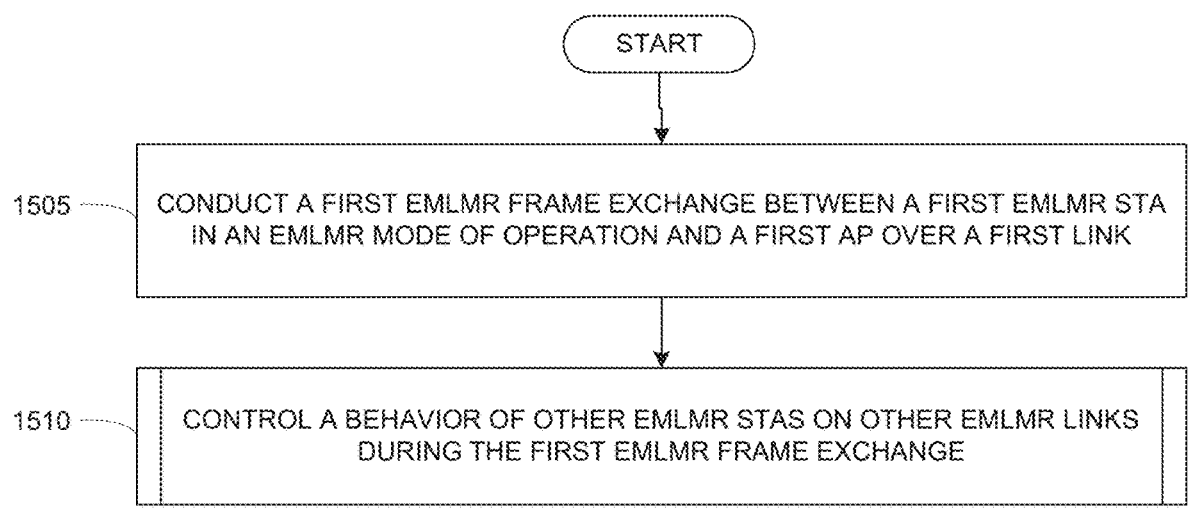
FIG. 15 illustrates an example process for facilitating EMLMR operations for MLDs according to various embodiments of the present disclosure.

FIG. 15 illustrates an example process for facilitating EMLMR operations for MLDs according to various embodiments of the present disclosure. The process of FIG. 15 is discussed as being performed by a non-AP MLD, but it is understood that a corresponding AP MLD performs a corresponding process. Additionally, for convenience the process of FIG. 15 is discussed as being performed by a WI-FI non-AP MLD comprising a plurality of EMLMR STAs that each comprise a transceiver configured to configured to form a link with a corresponding AP affiliated with a WI-FI AP MLD, wherein each of the links is configured to support a respective basic MCS and NSS, and the links are EMLMR links configured to operate in an EMLMR mode of operation in which the EMLMR links support an enhanced MCS and NSS. However, it is understood that any suitable wireless communication device could perform these processes.

Referring to FIG. 15, the process begins with the non-AP MLD conducting a first EMLMR frame exchange between a first of the EMLMR STAs in an EMLMR mode of operation and a first of the APs over a first of the links (step 1505). In some embodiments the first EMLMR frame exchange is initiated by the non-AP MLD, while in other embodiments it is initiated by the AP MLD, The first EMLMR frame exchange may be conducted with varying MCS and NSS in different embodiments, as discussed further below.

The non-AP MLD then controls a behavior of other EMLMR STAs on other EMLMR links during the first EMLMR frame exchange (step 1510).

In some embodiments of step 1510, the AP MLD has initiated the first EMLMR frame exchange, the non-AP MLD is participating in the frame exchange, and the frame exchange is conducted at the enhanced MCS and NSS. In one such embodiment, at step 1510 the non-AP MLD controls the behavior of the other EMLMR STAs so that they do not support DL EMLMR frame exchanges with the AP MLD for the duration of the first EMLMR frame exchange (e.g., the AP MLD treats the other EMLMR STAs as if they are in the doze state).

In other such embodiments, at step 1510 the non-AP MLD controls the behavior of the other EMLMR STAs so that they still have some NSS available to support DL EMLMR frame exchanges with the AP MLD. For example, in one embodiment the EMLMR STAs may operate in one of two EMLMR operation modes—in the first mode the other EMLMR STAs do not support DL EMLMR frame exchanges with the AP MLD for the duration of the first EMLMR frame exchange conducted by the first EMLMR STA, while in the second mode the other EMLMR STAs will support DL EMLMR frame exchanges with 1 NSS. The EMLMR control field of the EOMNF may be used to indicate which of these two modes of EMLMR operation will be used when initiating EMLMR operation. In another embodiment, the other EMLMR STAs will support DL EMLMR frame exchanges with a variable number of NSS referred to as the retained NSS for the duration of the first EMLMR frame exchange conducted by the first EMLMR STA. The EML control field of the EOMNF may be used to indicate the number of retained NSS when initiating EMLMR operation. In these embodiments, the other APs of the AP MLD may initiate DL EMLMR frame exchanges with the other EMLMR STAs of the non-AP MLD according to the number of available NSS, however, the end times of the additional EMLMR frame exchanges must be before or aligned with the end time of the first EMLMR frame exchange.

In some embodiments of step 1510, the non-AP MLD is participating in the first EMLMR frame exchange and the frame exchange is conducted at an MCS and NSS that is less than or equal to the enhanced MCS and NSS. In one such embodiment, at step 1510 the non-AP MLD controls the behavior of the other EMLMR STAs so that they will not initiate any UL EMLMR frame exchanges with the AP MLD (i.e., they will not contend for UL channel access on the other EMLMR links) for the duration of the first EMLMR frame exchange. In another such embodiment, at step 1510 the controls the behavior of the other EMLMR STAs so that they may initiate UL EMLMR frame exchanges with the AP MLD (i.e., they may contend for UL channel access on the other EMLMR links) at a predetermined number of NSS during the first EMLMR frame exchange. In these embodiments the end times of the additional EMLMR frame exchanges must be before or aligned with the end time of the first EMLMR frame exchange.

In some embodiments of step 1510, the non-AP MLD is capable of choosing between a basic TXOP mode of operation and an enhanced TXOP mode of operation for any given TXOP, and before the first EMLMR frame exchange has begun (i.e., before step 1505), the non-AP MLD determines which mode of operation to use for that TXOP. In the enhanced TXOP mode of operation, at step 1510 the non-AP MLD controls the first EMLMR STA to conduct the first EMLMR frame exchange at the enhanced MCS and NSS, and controls the other EMLMR STAs to enter the doze state for the duration of the first EMLMR frame exchange (i.e., the non-AP MLD will not participate in any additional EMLMR frame exchanges on the other EMLMR links during the first EMLMR frame exchange on the first EMLMR link). In the basic TXOP mode of operation, at step 1510 the non-AP MLD controls the first EMLMR STA to conduct the first EMLMR frame exchange at the basic MCS and NSS, and controls the behavior of the other EMLMR STAs so that they may participate in other EMLMR frame exchanges on the other EMLMR links at the respective basic MCS and NSS of the other links during the first EMLMR frame exchange. In this embodiment the end times of the additional EMLMR frame exchanges must be before or aligned with the end time of the first EMLMR frame exchange.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD), comprising:
   enhanced multi-link multi-radio (EMLMR) stations (STAs), each comprising a transceiver configured to form a link with a corresponding AP of an AP MLD, wherein:
     each of the links is configured to support a respective basic modulation and coding scheme (MCS) and number of spatial streams (NSS), the links are EMLMR links configured to operate in an EMLMR mode of operation in which the EMLMR links support an enhanced MCS and NSS, and
a first of the EMLMR STAs, in the EMLMR mode of operation, is configured to conduct a first EMLMR frame exchange with a first of the APs over a first of the links; and
a processor operably coupled to the EMLMR STAs, the processor configured to control a behavior of other EMLMR STAs on other EMLMR links during the first EMLMR frame exchange.

2. The non-AP MLD of claim 1, wherein:
the first EMLMR frame exchange is conducted at the enhanced MCS and NSS, and
the processor is configured to control the other EMLMR STAs to not support downlink (DL) EMLMR frame exchanges during the first EMLMR frame exchange.

3. The non-AP MLD of claim 1, wherein:
the first EMLMR frame exchange is conducted at the enhanced MCS and NSS, and
the processor is configured to control the other EMLMR STAs to support at least 1 NSS for DL EMLMR frame exchanges during the first EMLMR frame exchange.

4. The non-AP MLD of claim 1, wherein:
the first EMLMR frame exchange is conducted at the enhanced MCS and NSS, and
the processor is configured to control the other EMLMR STAs to:
  operate in a first mode and not support DL EMLMR frame exchanges during the first EMLMR frame exchange; or
  operate in a second mode and support 1 NSS for DL EMLMR frame exchanges during the first EMLMR frame exchange.

5. The non-AP MLD of claim 4, wherein:
at least one of the EMLMR STAs is further configured to transmit, to the corresponding AP, a notification frame that includes:
  an indication to transition into the EMLMR mode of operation before the first EMLMR frame exchange, and
  an indication that the other EMLMR STAs will operate in either the first mode or the second mode during the first EMLMR frame exchange.

6. The non-AP MLD of claim 1, wherein:
the first EMLMR frame exchange is conducted at the enhanced MCS and NSS,
the processor is configured to control each of the other EMLMR STAs to support a respective number of NSS for DL EMLMR frame exchanges during the first EMLMR frame exchange, and
at least one of the other EMLMR STAs is configured to transmit, to the corresponding AP before the first EMLMR frame exchange, a notification frame that indicates the respective number of NSS supported for DL EMLMR frame exchanges by the other EMLMR STAs.

7. The non-AP MLD of claim 1, wherein:
the first EMLMR frame exchange is conducted at a number of MCS and NSS that does not exceed the enhanced MCS and NSS, and
the processor is configured to control the other EMLMR STAs to refrain from initiating any uplink (UL) EMLMR frame exchanges during the first EMLMR frame exchange.

8. The non-AP MLD of claim 1, wherein:
the first EMLMR frame exchange is conducted at a number of MCS and NSS that does not exceed the enhanced MCS and NSS, and
the processor is configured to control the other EMLMR STAs to support initiation of UL EMLMR frame exchanges such that end times of the UL EMLMR frame exchanges align with or end before an end time of the first EMLMR frame exchange.

9. The non-AP MLD of claim 1, wherein:
the first EMLMR frame exchange is conducted at a number of MCS and NSS that does not exceed the enhanced MCS and NSS,
the processor is configured to control each of the other EMLMR STAs to support the respective basic MCS and NSS for DL EMLMR frame exchanges during the first EMLMR frame exchange, and
at least one of the other EMLMR STAs is further configured to transmit, to the corresponding AP during the first EMLMR frame exchange, a bigger frame that indicates that the at least one other EMLMR STA supports the respective basic MCS and NSS for DL EMLMR frame exchanges during the first EMLMR frame exchange.

10. The non-AP MLD of claim 1, wherein the processor is further configured to:
determine to operate the EMLMR STAs either in an enhanced mode or a basic mode for the first EMLMR frame exchange based on an indication in an initial frame transmitted by the AP MLD to initiate the first EMLMR frame exchange,
in the enhanced mode, control the first EMLMR STA to conduct the first EMLMR frame exchange at the enhanced MCS and NSS, and control the other EMLMR STAs to enter a doze state during the first EMLMR frame exchange, and
in the basic mode, control the first EMLMR STA to conduct the first EMLMR frame exchange at the basic MCS and NSS of the first link, and control each of the other EMLMR STAs to support the respective basic MCS and NSS for EMLMR frame exchanges during the first EMLMR frame exchange.

11. A method of wireless communication performed by a non-access point (AP) multi-link device (MLD) that comprises enhanced multi-link multi-radio (EMLMR) stations (STAs) that each form a link with a corresponding AP of an AP MLD, the method comprising:
conducting a first EMLMR frame exchange between a first of the EMLMR STAs in an EMLMR mode of operation and a first of the APs over a first of the links, wherein each of the links supports a respective basic modulation and coding scheme (MCS) and number of spatial streams (NSS) and the links are EMLMR links that support an enhanced MCS and NSS in the EMLMR mode of operation; and
controlling a behavior of other EMLMR STAs on other EMLMR lurks during the first EMLMR frame exchange.

12. The method of claim 11, further comprising:
controlling the other EMLMR STAs to not support downlink (DL) EMLMR frame exchanges during the first EMLMR frame exchange,
wherein the first EMLMR frame exchange is, conducted at the enhanced MCS and NSS.

13. The method of claim 11, further comprising:
controlling the other EMLMR STAs to support at least 1 NSS for DL EMLMR frame exchanges during the first EMLMR frame exchange, wherein the first EMLMR frame exchange is conducted at the enhanced MCS and NSS.

14. The method of claim 11, further comprising:
controlling the other EMLMR STAs to:
 operate in a first mode and not support DL EMLMR frame exchanges during the first EMLMR frame exchange; or
 operate in a second mode and support 1 NSS for EMLMR frame exchanges during the first EMLMR frame exchange,
wherein the first EMLMR frame exchange is conducted at the enhanced MCS and NSS.

15. The method of claim 14, further comprising:
transmitting, from at least one of the EMLMR STAs to the corresponding AP, a notification frame that includes:
 an indication to transition into the EMLMR mode of operation before the first EMLMR frame exchange, and
 an indication that the other EMLMR STAs will operate in either the first mode or the second mode during the first EMLMR frame exchange.

16. The method of claim 11, further comprising:
controlling each of the other EMLMR STAs to support a respective number of NSS for DL EMLMR frame exchanges during the first EMLMR frame exchange; and
transmitting, from at least one of the other EMLMR STAs to the corresponding AP before the first EMLMR frame exchange, a notification frame that indicates the respective number of NSS supported for DL EMLMR frame exchanges by the other EMLMR STAs,
wherein the first EMLMR frame exchange is conducted at the enhanced MCS and NSS.

17. The method of claim 11, further comprising:
controlling the other EMLMR STAs to refrain from initiating any uplink (UL) EMLMR frame exchanges during the first EMLMR frame exchange,
wherein the first EMLMR frame exchange is conducted at a number of MCS and NSS that does not exceed the enhanced MCS and NSS.

18. The method of claim 11, further comprising:
controlling the other EMLMR STAs to support initiation of UL EMLMR frame exchanges such that end times of the UL EMLMR frame exchanges align with or end before an end time of the first EMLMR frame exchange,
wherein the first EMLMR frame exchange is conducted at a number of MCS and NSS that does not exceed the enhanced MCS and NSS.

19. The method of claim 11, further comprising:
determining to operate the EMLMR STAs either in an enhanced mode or a basic mode for the first EMLMR frame exchange based on an indication in an initial frame transmitted by the AP MLD to initiate the first EMLMR frame exchange; and
in the enhanced mode, controlling the first EMLMR STA to conduct the first EMLMR frame exchange at the enhanced MCS and NSS, and controlling the other EMLMR STAs to enter a doze state during the first EMLMR frame exchange; or
in the basic mode, controlling the first EMLMR STA to conduct the first EMLMR frame exchange at the basic MCS and NSS of the first link, and controlling each of the other EMLMR STAs to support the respective basic MCS and NSS for EMLMR frame exchanges during the first EMLMR frame exchange.

20. A non-transitory computer-readable medium configured to store instructions that, when executed by a processor, cause a non-access point (AP) multi-link device (MLD) to:
 conduct a first enhanced multi-link multi-radio (EMLMR) frame exchange between the non-AP MLD and an AP MLD, wherein:
  the non-AP MLD comprises EMLMR stations (STAs) that each form a link with a corresponding AP of the AP MLD,
  each of the links supports a respective basic modulation and coding scheme (MCS) and number of spatial streams (NSS), and the links are EMLMR links that support an enhanced MCS and NSS in an EMLMR mode of operation, and
  the first EMLMR frame exchange is conducted between a first of the EMLMR STAs in the EMLMR mode of operation and a first of the APs over a first of the links; and
 control a behavior of other EMLMR STAs on other EMLMR links during the first EMLMR frame exchange.

* * * * *